Figure 1:
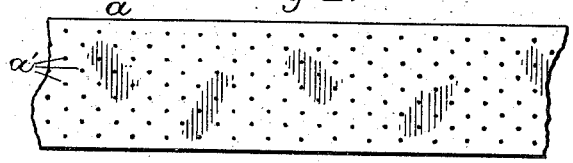

(No Model.)

I. F. WILLIAMS.
MANUFACTURE OF VULCANIZED RUBBER GOODS.

No. 284,936. Patented Sept. 11, 1883.

Attest:
Philip F. Larner
Lowell Bartle

Inventor:
Isaac F. Williams
By M. C. Mood
Attorney

United States Patent Office.

ISAAC F. WILLIAMS, OF BRISTOL, RHODE ISLAND.

MANUFACTURE OF VULCANIZED RUBBER GOODS.

SPECIFICATION forming part of Letters Patent No. 284,936, dated September 11, 1883.

Application filed August 9, 1883. (No model.)

*To all whom it may concern:*

Be it known that I, ISAAC F. WILLIAMS, of the town and county of Bristol, in the State of Rhode Island, have invented certain new and useful Improvements in the Manufacture of Vulcanized Rubber Goods; and I do hereby declare that the following specification, taken in connection with the drawings furnished and forming a part thereof, is a clear, true, and complete description of my said invention.

My said improvements relate exclusively to the manufacture of such well-known lines of goods as involve the union by vulcanization of closely-piled layers of vulcanizable compound, or layers of textile fabrics previously coated or heavily treated with such compounds; and my object is to secure a more uniform and reliable union of said layers than is possible, as I believe, by the employment of the methods in use prior to my invention.

It is well known that in the making up of such goods as rubber boots and shoes, rubber clothing and belting, for instance, the comparatively soft or green rubber-coated fabrics, and also sheets of compound in a soft or green condition, are more or less piled flatly one upon another, and secured in position by the normal adhesiveness of the compound, more or less supplemented by the use of rubber cement, or a solvent, and that in thus piling the layers more or less air is liable to be left and confined between the coincident surfaces, which, when expanded by the heat incident to vulcanization, prevents uniform adhesion of the layers, and causes what are called "air-blisters." It is also well known that, even if the air be apparently all expelled and a seemingly perfect preliminary union of the layers accomplished, intervening blisters are frequently formed by reason of the heated gases developed during the process of vulcanization, and said gases and air combined frequently form blisters of extensive area, which variously impair the durability and efficiency of the goods. It has long been customary with rubber-workers, whenever the presence of air is detected by the "bulging" appearance of a layer, to laterally open the "bulge," to form an air-vent, and then to force the coincident surfaces into contact; but this is obviously only possible when the air is in considerable volume, and it does not in made-up goods provide for the venting of gases developed during vulcanization at points remote from the one or more occasional openings. Now, in accordance with my invention I thoroughly puncture the layers at regular and frequent intervals of space, so that when piling a sufficiently free vent is always afforded for the escape of air, thereby securing a good preliminary union, and also so that during the process of vulcanization both air and gas may have such free vent as will obviate the liability of "blisters." This puncturing may be performed in the sheeted compound, or in the compound-coated fabrics, and in goods involving parts cut from patterns the perforation may be accomplished by means of toothed plates corresponding in general form with the outline of the pattern to which the parts were cut, so as to locate the perforations sufficiently remote from the outline edge of the part in each case to enable a good edge union of the part to the surface of the layer upon which it is applied, and also enable a smooth outline finish. I find that punctures properly made do not impair the water-proof capacities of goods, because in vulcanizing they become, finally, well filled; but it is always desirable, for the sake of proper external finish, that the puncturing be done at the back of inner layers, whenever exposed, so as to leave the outer surface of outer layers intact, and as if no puncturing had been involved. Although it is to be understood that the puncturing of the layers prior to their union with other layers is within my invention, it is also to be understood that in puncturing a layer after it has been placed upon another an important result accrues, which is not possible when separately punctured, provided the punctures extend from the rear surface of one layer wholly through that layer and partially through or into the next, thereby causing integral portions of one layer to be forced bodily into the next, and especially true is this when the puncturing-points are slightly flattened or blunted. This mechanical blending of integral portions of one layer with another adjacent to each puncture causes said integral portions to operate as rubber stitches or ties, so that when vulcanized the two layers are partially incorporated with each other, and so firmly united as to render their separation practically impossible, and the punctures thus made serve their purpose as vents for air and gas quite as well as when the rear layer is punctured prior to its application to another.

In more particularly describing my invention it will be impracticable to refer to and illustrate each and every line of goods to the manufacture of which my invention is applicable; but I will describe the same so far as relates to rubber belts and rubber boots and shoes, which I believe will be sufficient to enable persons skilled in rubber-working to practice my invention in any desirable connection.

Figure 2:
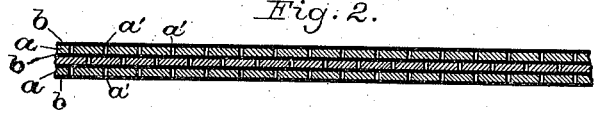
Figure 3:
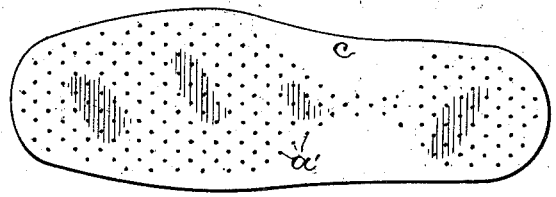
Figure 4:
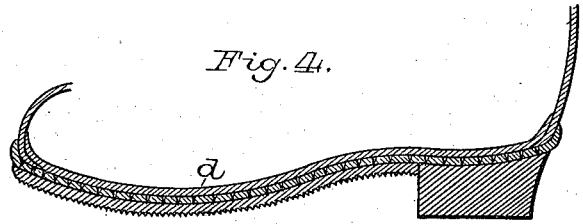
Figure 5:
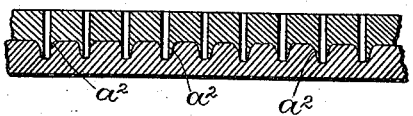

Referring to the drawings, Figure 1 represents in surface view a length of canvas coated with vulcanizable gum compound and punctured in accordance with my invention. Fig. 2 represents a section of three-ply belting built up from gum-coated canvas perforated as in Fig. 1. Fig. 3 is a top view of a main sole for a rubber boot, punctured in accordance with my invention for both the heel and the tap or tread sole. Fig. 4 is a longitudinal central section of the same through a tap-sole and a heel adhesively attached thereto, with the whole applied to a boot. Fig. 5 is a sectional view of two layers of vulcanizable compound, the upper of which is punctured, so as to force integral portions thereof into the lower layer.

Referring now to Figs. 1 and 2, it is to be distinctly understood that the strip of canvas $a$ is well charged with rubber compound or solution, and heavily coated on both sides with a layer, $b$, of gum compound, and that said coated canvas is punctured or pierced, as at $a'$, throughout its surface, except closely along its edge. The perforations may be accomplished immediately after the goods leave the calendar or other coating machine by means of apparatus involving, for instance, a reciprocating plunger having its end provided with puncturing-points in an obvious manner, and the canvas in full width may be thus coated and perforated, and thereafter cut into strips of proper width; but in that case the puncturing teeth will preferably be arranged in longitudinal series, so as to afford intervening longitudinal spaces which are not punctured, and at such intervals apart as would enable strips of desired width to be cut from the punctured fabric. As seen in Fig. 2, when such punctured strips are piled one upon another, as in a belt, the perforations in each strip allow of the venting of air during the operations of piling and compression, and also allow of the escape of gases during the operation of vulcanization. It will be within one feature of my invention if the fabric be unpunctured before piling, and thereafter the pile be punctured, in which case the latter operation can be performed from either or both sides of the pile, the length of the piercing-points being properly proportioned to the thickness of the pile in each case. In all cases it is to be understood that when tensile strength is requisite the puncturing-points should merely displace but not cut the textile fabric. In this connection I will refer to rubber clothing, which, as is well known, frequently involves the piling of two, three, or more thicknesses of more or less heavily coated fabric—as, for instance, bindings, lapels, and re-enforces for buttons, button-holes, &c., wherein a perfect adhesion and strong, reliable union is a matter of much importance. In such goods it will be undesirable for the exterior or finished surfaces to be disfigured by puncturing, and therefore the piercing is done from the rear surface of the goods, the length of the points being less than the thickness of the pile, and arranged with reference to desired outline in each case upon a handled stamp for use with a mallet, or merely by pressure from the hand.

In the manufacture of rubber boots and shoes my invention is of great practical value, and especially in connection with the application to the main sole of tread or tap soles and heels. It is well known that blisters often occur between heels and main soles, which cause the heels to be readily detached, and the same is true of tap-soles, and in neither case can the presence of such blisters be determined in the finished goods until the weakness incident thereto has been manifested by actual use in the loss of a heel or a tap-sole. The main soles can be punctured or perforated prior to the union therewith of the tap-sole or the heel, but preferably after the application of either or both.

As seen in Fig. 3, the upper surface of the main sole $c$, composed wholly of gum compound, is perforated or punctured, as at $a'$, throughout its extent, save at or near the edges, and said punctured or perforated portions have outlines corresponding to the general outline of the tap-sole and the heel which is to be applied thereto. If the perforating be done after the application of the tap-sole or the heel, or both, the puncturing-points should be, for the best results, long enough and slightly blunted, so as to punch or force integral portions of the material of the main sole bodily into the lower layer, as indicated in Fig. 5 at $a^2$, thus forming elastic ties which contribute to a firm and reliable union of the parts. This puncturing also affords a release for such air as may be inclosed between the coincident surfaces, and also vents the gases incident to vulcanization, although said upper surface of the main sole has meantime been applied and cemented to the body of the boot, because the air and gases escaping by way of the perforations readily find relief by permeating and passing through the comparatively porous layers or mass of rag compound $d$, Fig. 4, which is usually employed in that connection in the manufacture of rubber boots and shoes. As hereinbefore indicated, the puncturing or perforating sufficiently for my purpose need not and does not impair the water-proof capacities of the goods, because prior to vulcanization the perforations serve for the exit of air during the compression of layer upon layer, and during vulcanization the gases are also vented; but after the gas has been thus vented, the compound is soft enough to cause the perforations or punctures to close and be hermetically sealed when the compound hardens by cooling. Rubber boots and shoes with their tap-soles or heels, or both, applied to the main sole in accordance with my invention are so radically improved as to serviceable durability that such goods will be hereafter made the subject of separate application for Letters Patent.

Having thus described my invention, I claim as new and desire to secure by Letters Patent—

1. The improvement in the manufacture of rubber goods involving the union by vulcanization of two or more closely-piled layers composed in whole or in part of vulcanizable gum compound, which consists in thoroughly puncturing or perforating the main portion of one or more of said layers prior to their union and prior to vulcanization, substantially as hereinbefore described, whereby air and the gases incident to vulcanization are vented from between the layers and a reliable union thereof obtained, as set forth.

2. The improvement in the manufacture of rubber goods involving the union by vulcanization of two or more layers composed in whole or in part of vulcanizable compound, which consists in piling said layers and puncturing the same through one layer into another from either or both sides of the pile, substantially as described, whereby air and gases are vented by way of the perforations, and integral portions of one layer are forced or punched into the other, as set forth.

ISAAC F. WILLIAMS.

Witnesses:
ANDREW R. TROTTER,
J. HENRY WEED.